(12) United States Patent
Salo et al.

(10) Patent No.: US 7,280,660 B2
(45) Date of Patent: Oct. 9, 2007

(54) RECEIVER

(75) Inventors: Juha Salo, Littoinen (FI); Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 880 days.

(21) Appl. No.: 09/894,532

(22) Filed: Jun. 29, 2001

(65) Prior Publication Data

US 2002/0021809 A1 Feb. 21, 2002

(30) Foreign Application Priority Data

Jun. 30, 2000 (GB) .................................. 0016245.3

(51) Int. Cl.
*H04N 7/167* (2006.01)
*H04N 7/16* (2006.01)

(52) U.S. Cl. ...................... 380/200; 380/202; 380/210; 380/270

(58) Field of Classification Search ................ 380/200, 380/202, 210, 270
See application file for complete search history.

(56) References Cited

U.S. PATENT DOCUMENTS

| | | | |
|---|---|---|---|
| 5,822,324 A | 10/1998 | Kostresti et al. | |
| 5,960,086 A | 9/1999 | Atalla | |
| 6,005,603 A | 12/1999 | Flavin | |
| 6,023,689 A * | 2/2000 | Herlin et al. .................. | 705/67 |
| 6,052,145 A | 4/2000 | Macrae et al. | |
| 6,081,693 A | 6/2000 | Wicks | |
| 6,510,515 B1 * | 1/2003 | Raith ......................... | 713/163 |
| 6,567,796 B1 | 5/2003 | Yost et al. | |
| 6,580,906 B2 * | 6/2003 | Bilgic et al. .............. | 455/422.1 |
| 6,606,481 B1 | 8/2003 | Tegler et al. | |
| 6,662,020 B1 * | 12/2003 | Aaro et al. .............. | 455/552.1 |
| 6,674,860 B1 * | 1/2004 | Pirila .......................... | 380/247 |
| 6,707,915 B1 * | 3/2004 | Jobst et al. ................. | 380/247 |
| 6,774,926 B1 | 8/2004 | Ellis et al. | |
| 6,804,357 B1 * | 10/2004 | Ikonen et al. ............... | 380/241 |
| 2002/0039904 A1 * | 4/2002 | Anderson .................... | 455/456 |
| 2002/0059614 A1 * | 5/2002 | Lipsanen et al. ............. | 725/75 |

FOREIGN PATENT DOCUMENTS

| | | |
|---|---|---|
| AU | 1659299 | 7/1999 |
| CN | 1288619 | 3/2001 |
| DE | 4424380 | 1/1996 |
| DE | 4424380 A1 | 1/1996 |
| EP | 0 179 612 | 4/1986 |
| EP | 0 191 684 | 8/1986 |
| EP | 0696152 | 2/1996 |
| EP | 0782364 | 7/1997 |

(Continued)

OTHER PUBLICATIONS

GB Search Report dated Jan. 4, 2001, Application No. GB 0016238.8, 1 page.

(Continued)

*Primary Examiner*—Kambiz Zand
(74) *Attorney, Agent, or Firm*—Harrington & Smith, PC

(57) ABSTRACT

The present invention provides a method and apparatus for receiving and transmitting signals via multiple communication channels involving receivers capable of receiving digital television signals, such as signals according to the terrestrial digital video broadcasting (DVB-T) standard are also commonplace.

20 Claims, 3 Drawing Sheets

FOREIGN PATENT DOCUMENTS

| | | |
|---|---|---|
| EP | 0804012 | 10/1997 |
| EP | 0763942 | 3/1999 |
| EP | 0957606 | 11/1999 |
| EP | 0999678 | 5/2000 |
| EP | 1300035 | 8/2006 |
| GB | 2294844 | 5/1996 |
| GB | 2335576 | 9/1999 |
| WO | 9636141 | 11/1996 |
| WO | 9856181 | 12/1998 |
| WO | 9904568 | 1/1999 |
| WO | 9933076 | 7/1999 |
| WO | 9935771 | 7/1999 |
| WO | 0018123 | 3/2000 |

OTHER PUBLICATIONS

GB Search Report dated Jan. 17, 2001, Application No. GB 0016245.3, 3 pages.

GB Search Report dated Feb. 21, 2001, Application No. GB 0016245.3, 2 pages.

International Search Report dated Nov. 30, 2001, Application No. PCT/EP 01/07239, 7 pages.

International Search Report dated Feb. 21, 2002, Appliaction No. PCT/EP 01/07209, 3 pages.

European Search Report dated Jul. 21, 2004, Application No. EP 04 00 0799, 3 pages.

Chinese Office Action dated Mar. 12, 2004, Chinese Application No. 01814700.3, 10 pages.

European Office Action dated Jan. 31, 2005, Application No. 01 957 887.1, 5 pages.

European Telecommunications Standard Institute, Digital Video Broadcasting (DVB); Interaction channel through the Global System for Mobile communications (GSM), Feb. 1999, 14 pages.

* cited by examiner

RECEIVER

BACKGROUND OF THE INVENTION

The present invention relates to receivers such as multi-carrier and cellular receivers.

Cellular receivers, in the form of portable radiotelephones are commonplace, and their design and operation is well understood. Such portable radiotelephones can be used for making and receiving telephone calls, sending and receiving messages, and even browsing world-wide computer network such as the Internet. Many standards exist for portable radiotelephones, including the global system for mobile communications (GSM) and the general radio packet service (GPRS)

Receivers capable of receiving digital television signals, such as signals according to the terrestrial digital video broadcasting (DVB-T) standard are also commonplace.

The use and operation of consumer set-top-boxes (STB) for receiving digital video broadcasting (DVB-T) transmissions are well known. Such STBs are capable of receiving a large number of digital television channels, data and other interactive services.

SUMMARY OF THE INVENTION

According to a first aspect of the present invention, there is provided a terminal having a first receiver for receiving an encrypted first signal from a first communications network comprising: a second receiver for receiving from a second communications network a second signal conveying information enabling said encrypted signal to be decrypted.

Advantageously, the present invention provides a receiver having a first and a second receiver for receiving signals from two different communications networks. In a first embodiment of the present invention this results in increased power efficiency, since one of the receivers can be effectively switched off while not required. Schedule or configuration data can, however, still be received on the other receiver. The received schedule or configuration data can be used to switch on the other receiver at an appropriate time. This configuration allows the receiver to receive non-scheduled data, such as news flashes, results from sporting events, share prices etc.

In a second embodiment of the present invention, a receiver is able to receive a broadcast signal via a broadcast network, and to receive additional and complementary information thereto via a second telecommunications network. This is particularly advantageous in security applications, where security keys and other private or sensitive data may be sent via a more private telecommunications network. For example, if a pay-per-view film is being broadcast in encrypted form, the security keys needed to decrypt the film may be sent via the second telecommunications network. This prevents the security keys from unauthorized access of the broadcast network.

According to a second aspect of the present invention, there is provided apparatus for transmitting an encrypted signal on a first communications network, comprising: a transmitter for transmitting on a second communications network information enabling said encrypted signal to be decrypted.

According to a third aspect of the present invention, there is provided a method of receiving an encrypted first signal from a first communications network comprising: receiving from a second communications network a second signal conveying information enabling said encrypted signal to be decrypted; and decrypting said encrypted first signal using said received information.

According to a fourth aspect of the present invention, there is provided a method of transmitting an encrypted signal on a first communications network, comprising: transmitting on a second communications network information enabling said encrypted signal to be decrypted.

According to a fifth aspect of the present invention, there is provided a terminal having a first receiver for receiving a first signal from a first communications network comprising: a second receiver for receiving a second signal conveying complementary information relating to said first signal from a second communications network.

According to a sixth aspect of the present invention, there is provided Apparatus for transmitting a signal to a receiver via a first communications network comprising: a transmitter for transmitting complementary information relating to said signal via a second communication network.

According to a seventh aspect of the present invention, there is provided a method of receiving a first signal from a first communications network comprising: receiving a second signal conveying complementary information relating to said first signal from a second communications network.

According to a eighth aspect of the present invention, there is provided A method of transmitting a signal to a receiver via a first communications network comprising: transmitting complementary information relating to said signal via a second communication network.

BRIEF DESCRIPTION OF THE DRAWINGS

The invention will now be described, by way of example only, with reference to the accompanying diagrams, in which.

DETAILED DESCRIPTION OF THE PREFERRED EMBODIMENTS OF THE INVENTION

Figure 1:
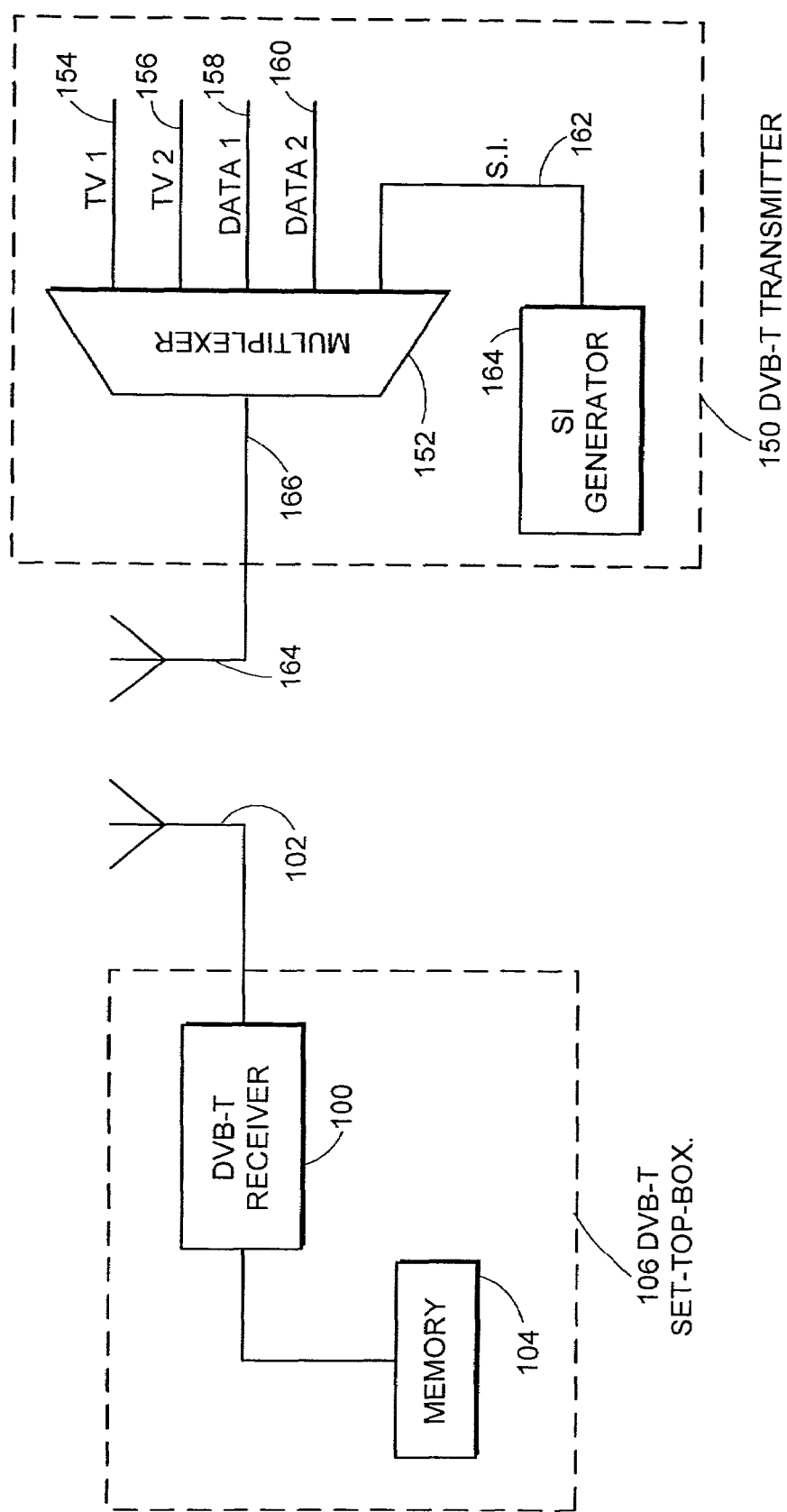
FIG. 1 is a block diagram of a typical consumer receiver/transmitter arrangement.

FIG. 1 is a block diagram of a typical consumer receiver/transmitter arrangement in which a terrestrial digital video broadcasting (DVB-T) transmitter 150 transmits a DVB-T signal to a DVB-T set-top-box receiver 106.

In the transmitter 150, a number of television channels 154 and 156 are multiplexed together with a number of data channels 158 and 160 by a multiplexer 152. In addition to this, service information (SI) 162, which contains details of each of the other multiplexed channels, is also input to the multiplexer 152, provided by a SI generator 164. The multiplexer creates a single, multiplexed, signal 166 which contains all of the separate channels 154, 156, 158 and 160, along with the SI 162. Further details of the multiplexing and SI may be found in the DVB-T specification (EN 300 468) which is incorporated herein by reference. The multiplexed signal 166 is transmitted via an antenna 164, across a transmission channel, to an antenna 102 of a set-top-box receiver 106. In the case of DVB-T, the transmission channel is a terrestrial transmission channel. However, the transmission channel could, alternatively, be a satellite, microwave, cable or optical channel.

The signals received by the antenna 102 are input to a DVB-T receiver 100 which enables the user to select a desired channel. Received data may also be stored in a memory 104.

While the set-top-box 106 is switched on, the DVB-T receiver 100 is also powered up and receiving DVB-T signals. The DVB-T receiver is constantly decoding SI information which provides details of the content and location of each of the channels within the received multiplexed signal. The SI information also contain schedule details for each of the multiplexed channels. The schedule details allow a user to watch or record a specific program of interest. For example, if the set-top-box 106 is connected to a personal computer (not shown), it is possible to receive data transmitted over the DVB-T network for use with the personal computer. In this way, the transmission of large data files can be broadcast, to a large audience, using the high data rates provided by DVB-T transmission. If a data file is due to be transmitted at a certain time on a certain channel, the SI information will contain this information which can be used by the personal computer to ensure that receiver receives the required data.

SI information may change frequently, to reflect not only changes in program scheduling, but also to reflect reallocation of frequencies and channels etc by the broadcaster. For example, it is possible for a channel to broadcast on a different frequency to originally scheduled. Since the SI contains details of the frequencies (or changes to the frequencies), a receiver should always be able to receive the desired channel and/or program. Some set-top-boxes store SI information in a memory, thereby allowing users to browse a schedule or program guide. However, due to the nature of SI information, the SI information is updated frequently to ensure that no discrepancies exist between the SI stored by the set-top-box and the SI being transmitted by the broadcaster.

Figure 2:
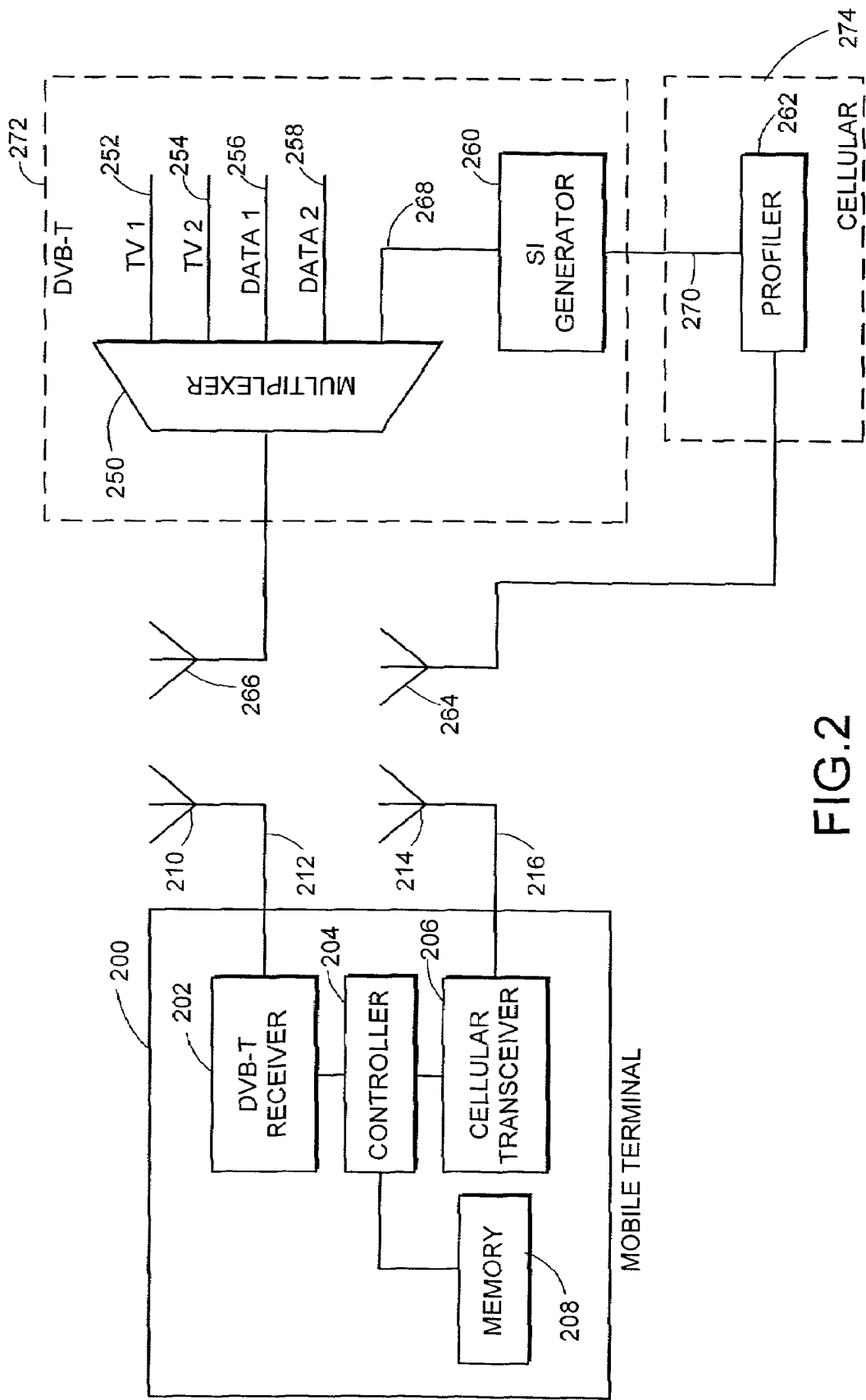
FIG. 2 is a block diagram of a first embodiment according to the present invention.

FIG. 2 shows a block diagram of a first embodiment according to the present invention. A mobile terminal 200 receives DVB-T transmissions from a DVB-T transmitter 272. The transmitted DVB-T signal is a multiplexed signal produced by a multiplexer 250. The multiplexer 250 accepts as inputs a number of channels 252, 254, 256 and 258 to produce the multiplexed signal. The channels may be television, audio or data channels. Service information (SI) data, which contains details of the multiplexed channels, is also input to the multiplexer 250. The SI data is generated by a SI generator 260, which may be a database containing schedule and location details of each of the channels.

The DVB-T signals are received by an antenna 210 of the mobile terminal 200 and are received and decoded by a DVB-T receiver 202.

In addition, and advantageously, the mobile terminal also receives an interactive channel from a cellular or other transmission network 274 at a cellular transceiver 206. The cellular transceiver 206 allows both the reception and transmission of signals between the mobile terminal 200 and the cellular network 274. The cellular network may be a GSM network, a general packet radio service (GPRS), third generation (3G) or other suitable network.

SI data generated by the SI generator 260 is also supplied to a profiler 262 of the cellular network 274. The profiler contains a database of information about each of the subscribers to the cellular network 274. The profiler may contain information such as, demographic data, income level, sports leisure interests, etc.

The operation of a first embodiment of the present invention will now be described by way of example.

According to the prior art, if a user wishes to receive a video clip each time his favorite football team scores during a football match, it is necessary that the DVB-T receiver 100 in the DVB-T set-top-box 106 is constantly powered up and is constantly receiving SI data. This is since the exact timing of when a goal will be scored is not known in advance. Accordingly, no schedule will exist in the SI data for this event. A DVB-T receiver must therefore wait for the SI data to indicate when the video clip will be broadcast. If the user is only interested in receiving video clips of the football match, this is particularly inefficient in terms of power consumption, especially for mobile terminals, since the DVB-T receiver just waiting, consuming power, for a specific video clip to be broadcast.

According to a first embodiment of the present invention, as exemplified in FIG. 2, the subscriber registers an interest in receiving video clips with the profiler 262 of the cellular network 274. The DVB-T receiver 202 of the mobile terminal 200 may then be powered down. When a goal is scored, and a video clip is available for broadcast, the broadcaster must schedule the video clip to be included in the existing DVB-T multiplex signal. This may involve rescheduling existing programs, and updating the SI data accordingly. Once a scheduled time has been established for the broadcast of the video clip, a service announcement is sent by the cellular network 274 to the cellular transceiver 206. The service announcement is received by the cellular transceiver 206 and is processed by the controller 204. The controller informs the DVB-T receiver 202 of when the video clip will be broadcast and other relevant associated data, such as channel location, encryption parameters etc. The DVB-T receiver can be powered up and configured in time to receive and decode the video clip. The video clip may also be stored in a memory 208. Once the desired video clip, or other data, has been received, the DVB-T receiver 202 can be once again powered down.

The service announcement may be in the form of SI data, or may alternatively be in the form of a special short message service (SMS) message containing the necessary timing and location information required by the DVB-T receiver. Alternative forms of service announcement may be used, both in terms of the data required to be sent and the protocol which is used for sending it.

In this way, the DVB-T receiver 202 can be powered down when not required for actual reception of data. This can produce large savings in power consumption, compared to the system of the prior art.

The profiler 262 also controls whether requested information is transmitted to a user via the DVB-T or cellular network. For example, if one million people have requested to see a video clip of goals from a particular football match, it is better to transmit the video clip via the DVB-T network. For such a large number of users, the DVB-T network provides a cost effective delivery means. The alternative would be to individually send the video clip via the cellular network which, with so many users, could impact severely on the operation of the cellular network.

If the number of users requesting to see a particular video clip is much smaller, it may be more economical to send it individually via the cellular network. The exact threshold levels will vary according to the pricing structure of the DVB-T and cellular networks, as well as the number of users requesting a particular item, and the volume of data required to be sent.

The cellular transceiver 206 may also be used to send an acknowledgement back to the cellular network 274, indicating whether the video clip was correctly received. This may be used for billing purposes, or also to request a re-sending of the video clip if it not received due to poor signal strength etc. Re-sending of the video clip may again take place either via the DBV-T or cellular network depending on demand and cost effectiveness.

A further advantage of the present invention is that, if schedule announcements are sent over the cellular network, it is possible to remove some or all of the SI data from DVB-T network. Since the SI data typically occupies up to 3 Mbits-$^{-1}$ this redundant bandwidth could be used for providing additional data or video channels.

In a further embodiment of the present invention, a profiler may be included in the mobile terminal 200. This may be instead of, or in addition to, the profiler 262 of the cellular network 274. A profiler on the mobile terminal may be used if the communications network used for the interactive channel supports broadcasting of data, such as via a GPRS network or other packet type network. The profiler can be configured according to user preferences, and will only accept service announcements which comply with the user preferences.

Figure 3:
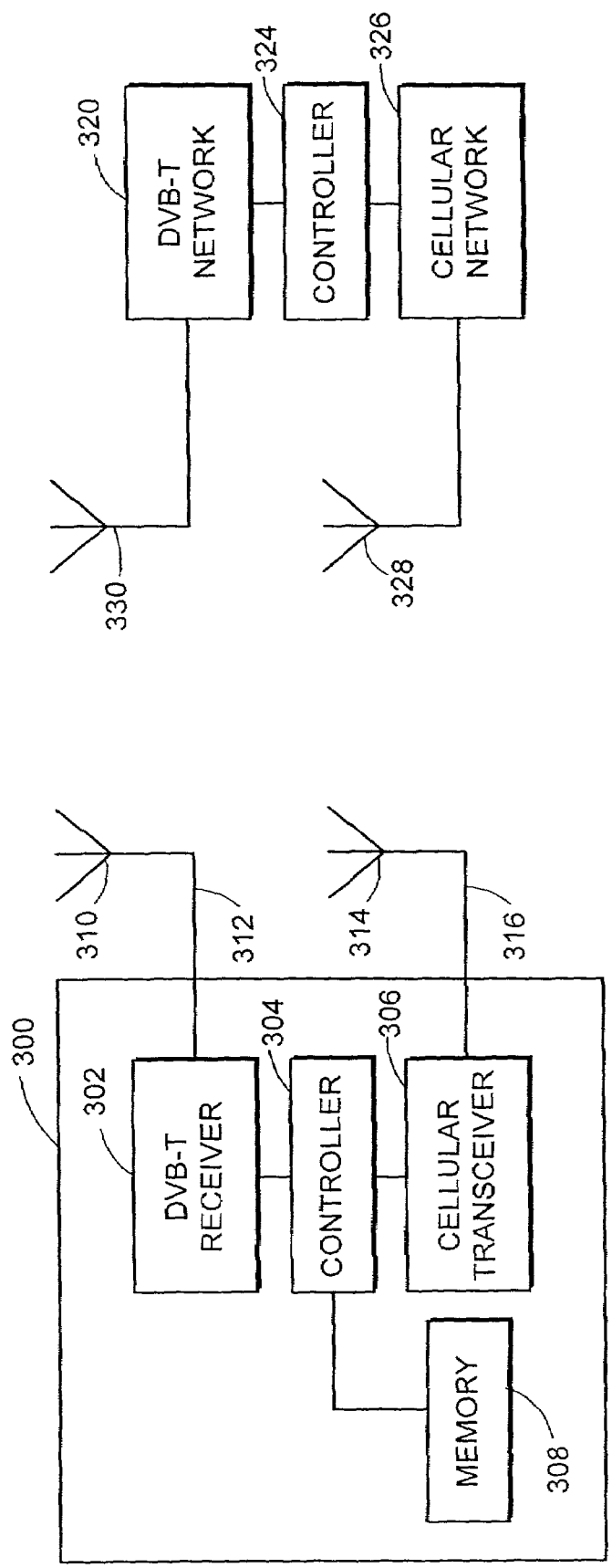
FIG. 3 is a block diagram of yet a further embodiment according to the present invention.

FIG. 3 shows yet a further embodiment of the present invention, which makes use of the additional interactive channel to provide increased security.

A mobile terminal 300, receives DVB-T signals via an antenna 310 at a DVB-T receiver 302. The DVB-T signals are provided and transmitted by a DVB-T network 320, via an antenna 330. The mobile terminal 300 also comprises a cellular transceiver 306 which can send and receive calls via a cellular network 326. The mobile terminal 300 also comprises a controller 304 which can either send or receive control information from the cellular transceiver 306, the DVB-T receiver 300 or a memory 308. A controller 324 is also provided to provide communication and control between the DVB-T network 320 and the cellular network 326.

This embodiment enables DVB-T data to be broadcast from the DVB-T network 320 to the mobile terminal 300. In addition, data related to the broadcast DVB-T signal may also be transmitted to the mobile terminal 300 via the cellular network 326.

For example, at present, when encrypted video or television channels are broadcast to a terminal, security keys are also broadcast over the broadcast channel to enable subscribers to decrypt the encoded data. Although the security keys are hidden in the broadcast signal, it is possible for unauthorized users to gain access to these keys by monitoring the broadcast signals. Using the present invention, the security keys or security data can be sent over the interactive channel, directly to each individual receiver. This makes it increasingly difficult for unauthorized users to obtain access to the security keys, since they are sent via a different path to the encrypted video signals. The security keys may be sent for either currently broadcast signals, or for broadcast signals which have yet to be broadcast. In a still further embodiment, the terminal 300 comprises a subscriber information module (SIM) (not shown) which may contain authorization or additional security data for use with either the cellular or DVB networks. The authorization or additional security data contained by the SIM may be used in conjunction with the security data to enable authorization or decryption of the signals received via the broadcast network.

In a still further embodiment of the present invention, on-line banking and other customer orientated services can use the present invention to improve the transmission of data, including Internet pages, to subscribers. For example, an on-line bank could broadcast using the DVB-T network pages of information containing high quality graphics, standard texts etc. Each page could then be personalized using personal data transmitted over the interactive channel. For example, a generic 'balance' sheet could be broadcast to all users containing the bank logo, background images etc. Personal balance data transmitted over the interactive channel could then be combined with the broadcast 'balance' sheet, to present to the user their own personal balance sheet.

The present invention therefore provides benefits not only in increase power efficiency of such systems, but also provides added security and benefits of being able to broadcast information to multiple users, and to send subscriber specific information related to that broadcast information using a separate, personal, communications link. In yet a further embodiment of the present invention, the interactive channel can used for both transmitting service announcements as well as security or private data.

Those skilled in the art will appreciate that although the present invention is described above with reference to DVB-T transmissions, the invention is not limited thereto. The same techniques could be applied to DVB (satellite) reception and transmission or any other similar or equivalent standards.

Equally, references to cellular networks and cellular transmission techniques could be replaced by fixed line, public switched telephone networks, or any other type of suitable communications network.

What is claimed is:

1. A terminal including a first receiver and a second receiver, wherein the first receiver is configured to receive an encrypted first signal from a first communications network and the second receiver is configured to receive from a second communications network a second signal conveying information for decrypting the encrypted first signal, wherein the first receiver is further configured to decrypt the encrypted first signal using the information received from the second communication network, and wherein the first receiver is different from the second receiver.

2. The terminal according to claim 1, comprising a subscriber identification module (SIM) containing security data for use in conjunction with the second signal for enabling the encrypted first signal to be decrypted.

3. The terminal according to claim 1, wherein the encrypted first signal is a digital video broadcasting signal (DVB) signal, and the first receiver is a digital video broadcasting (DVB) signal.

4. The terminal according to claim 1, wherein the second signal is a global system for mobile (GSM) signal, and the second receiver is a global system for mobile (GSM) receiver.

5. The terminal according to claim 1, wherein the second signal is a general packet radio service (GPRS) signal, and the second receiver is a general packet radio service (GPRS) receiver.

6. A terminal including a first receiver and a second receiver and a subscriber identification module (SIM) wherein:
   the first receiver is different from the second receiver, and
   the first receiver is configured to receive an encrypted first signal from a first communications network, the second receiver is configured to receive, from a second communications network, a second signal conveying decryption information and the subscriber identification module (SIM) containing security data, wherein the first receiver uses the conveyed decryption information in conjunction with the security data to decrypt the encrypted first signal.

7. An apparatus including:
a first transmitter for transmitting to a terminal, including a first receiver and a second receiver, an encrypted signal to the first receiver on a first communications network, wherein the first receiver is different from the second receiver; and
a second transmitter for transmitting on a second communications network information to the second receiver, wherein the information is used by the terminal to decrypt the encrypted signal.

8. The apparatus according to claim 7, wherein the encrypted signal is a digital broadcast video (DVB) signal, and the first communications network is a digital video broadcasting (DVB) network.

9. The apparatus according to claim 7, wherein the second communications network is a global system for mobile (GSM) network, and the transmitter is a global system for mobile (GSM) transmitter.

10. The apparatus according to claim 7, wherein the second communications network is a general packet radio service (GPRS) signal, and the second transmitter is a general packet radio service (GPRS) receiver.

11. A method of receiving with a terminal comprising a first receiver and a second receiver, wherein the first receiver is different from the second receiver, the method comprising the steps of:
with the first receiver, receiving an encrypted first signal from a first communications network;
with the second receiver, receiving from a second communications network a second signal conveying information for decrypting the encrypted signal; and
decrypting, with the first receiver, said encrypted first signal using said received information.

12. The method according to claim 11, comprising using security data stored on a subscriber identification module (SIM) in conjunction with the second signal for decrypting the encrypted first signal.

13. The method according to claim 11, comprising transmitting the signal as a digital video broadcasting (DVB) signal.

14. The method according to claim 11, comprising transmitting complementary information as the second signal via a global system for mobile (GSM) network.

15. The method according to claim 11, comprising transmitting complementary information as the second signal via a general packet radio service (GPRS) network.

16. A method of receiving with a terminal comprising a first receiver and a second receiver, wherein the first receiver is different from the second receiver, the method comprising the steps of:
with the first receiver, receiving an encrypted first signal from a first communications network;
with the second receiver, receiving from a second communications network a second signal conveying information for decrypting the encrypted first signal ; and
decrypting, with the first receiver, the encrypted first signal using the received information and security data retrieved from a subscriber identification module (SIM).

17. A method of transmitting to a terminal comprising a first receiver and a second receiver, wherein the first receiver and the second receiver are different, the method comprising the steps of:
with a first transmitter, transmitting an encrypted signal on a first communications network which is received by the first receiver; and
with a second transmitter, transmitting on a second communications network information which is received by the second receiver, wherein the terminal uses the information received by the second receiver to decrypt the encrypted signal.

18. The method according to claim 17, comprising transmitting the encrypted signal as a digital video broadcasting (DVB) signal.

19. The method according to claim 17, comprising transmitting complementary information as the information via a global system for mobile (GSM) network.

20. The method according to claim 17, comprising transmitting complementary information as the information via a general packet radio service (GPRS) network.

* * * * *

UNITED STATES PATENT AND TRADEMARK OFFICE
CERTIFICATE OF CORRECTION

PATENT NO. : 7,280,660 B2 Page 1 of 1
APPLICATION NO. : 09/894532
DATED : October 9, 2007
INVENTOR(S) : Juha Salo and Janne Aaltonen It is certified that error appears in the above-identified patent and that said Letters Patent is hereby corrected as shown below:

IN THE CLAIMS:

Column 6, line 46, delete "signal" and replace with --receiver--.

Signed and Sealed this

Second Day of September, 2008

JON W. DUDAS
*Director of the United States Patent and Trademark Office*